(12) United States Patent
Myung et al.

(10) Patent No.: US 12,005,520 B2
(45) Date of Patent: Jun. 11, 2024

(54) LASER BONDING APPARATUS AND METHOD

(71) Applicant: Samsung Electronics Co., Ltd., Suwon-si (KR)

(72) Inventors: Wooram Myung, Suwon-si (KR); Seonyoung Kim, Seoul (KR); Hyesun Yoon, Anyang-si (KR); Young-Chul Park, Cheonan-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 549 days.

(21) Appl. No.: 17/148,976

(22) Filed: Jan. 14, 2021

(65) Prior Publication Data

US 2021/0370439 A1 Dec. 2, 2021

(30) Foreign Application Priority Data

May 29, 2020 (KR) .................. 10-2020-0064691

(51) Int. Cl.
*B23K 26/10* (2006.01)
*B23K 26/08* (2014.01)
*B23K 26/20* (2014.01)

(52) U.S. Cl.
CPC ........ *B23K 26/103* (2013.01); *B23K 26/0876* (2013.01); *B23K 26/20* (2013.01)

(58) Field of Classification Search
CPC .............. B23K 1/0016; B23K 1/0056; B23K 26/0876; B23K 26/103; B23K 26/20

USPC ...................................................... 219/121.6
See application file for complete search history.

(56) References Cited

U.S. PATENT DOCUMENTS

| | | | |
|---|---|---|---|
| 5,506,398 A * | 4/1996 | Naruto | G11B 7/00 |
| 7,407,878 B1 * | 8/2008 | Li | H01L 24/11 |
| | | | 257/E23.021 |
| 8,853,002 B2 | 10/2014 | Lin et al. | |
| 9,916,989 B2 | 3/2018 | Yoon et al. | |
| 10,107,853 B2 * | 10/2018 | Butters | H05K 13/0817 |
| 2003/0086141 A1 * | 5/2003 | Glaser-Inbari | G11B 7/08564 |
| | | | 359/205.1 |
| 2017/0100794 A1 | 4/2017 | Wu et al. | |
| 2019/0214362 A1 | 7/2019 | Lim et al. | |
| 2019/0279958 A1 | 9/2019 | Chen et al. | |

FOREIGN PATENT DOCUMENTS

| | | | |
|---|---|---|---|
| CN | 101403030 | * | 4/2009 |
| KR | 101350512 B1 | | 1/2014 |

* cited by examiner

*Primary Examiner* — Dana Ross
*Assistant Examiner* — Joseph W Iskra
(74) *Attorney, Agent, or Firm* — Harness, Dickey & Pierce, P.L.C.

(57) ABSTRACT

Disclosed are laser bonding apparatuses and methods, The laser bonding apparatus comprises a stage configured to receive a substrate, a laser device that may be disposed on the stage and is configured to irradiate a laser beam onto the substrate, a first rotation support disposed outside of the stage and is configured to drivee the laser device to rotate in an azimuthal angle direction, and a second rotation support configured to support the laser device and configured to drive the laser device to rotate in a polar angle direction intersecting the azimuthal angle direction.

20 Claims, 11 Drawing Sheets

LASER BONDING APPARATUS AND METHOD

CROSS-REFERENCE TO RELATED APPLICATION

This U.S. nonprovisional application claims priority under 35 U.S.C § 119 to Korean Patent Application No. 10-2020-0064691 filed on May 29, 2020 in the Korean Intellectual Property Office, the disclosure of which is hereby incorporated by reference in its entirety.

BACKGROUND

The present inventive concepts relate to semiconductor fabrication apparatuses and methods, and more particularly, to laser bonding apparatuses and methods.

There has recently been an increasing tendency to require a flip-chip type substrate among printed circuit boards. The flip-chip type substrate is a product in which solder bumps are used to replace the conventional wires and to connect a semiconductor chip to the substrate. The solder bumps may be melted with radiation heat from the laser or Joule's heat from electric power to thereby bond the semiconductor chip to the substrate.

SUMMARY

Some example embodiments of the present inventive concepts provide laser bonding apparatuses and methods capable of removing or minimizing bonding defects of a plurality of semiconductor chips.

According to some example embodiments of the present inventive concepts, a laser bonding apparatus may comprise: a stage configured to receive a substrate; a laser device on the stage, the laser device configured to irradiate a laser beam onto the substrate; a first rotation support outside of the stage, the first rotation support configured to drive the laser device to rotate in an azimuthal angle direction; and a second rotation support configured to support the laser device and configured to drive the laser device to rotate in a polar angle direction intersecting the azimuthal angle direction.

According to some example embodiments of the present inventive concepts, a laser bonding apparatus may comprise: a stage configured to receive a substrate; a laser device on the stage, the laser device configured to provide the substrate with a laser beam to heat a plurality of semiconductor chips; a first rotation support configured to surround the stage and configured to support the laser device, the first rotation support configured to drive the laser device to rotate in an azimuthal angle direction; a second rotation support that includes a plurality of axle parts associated with opposite outer sidewalls of the first rotation support and an arc part connected between the plurality of axle parts, the arc part having a first contact point between the laser device and one of the plurality of axle parts; a plurality of guides with which the first rotation support is provided on an inner sidewall under the second rotation support, the guides having a plurality of second contact points that are arranged in a polar angle direction to correspond to the first contact point; and a controller connected to the first contact point and the second contact points, the controller configured to distinguish an inclined angle in the polar angle direction of the laser device with respect to the semiconductor chips whenever the first contact point is connected to one of the second contact points.

According to some example embodiments of the present inventive concepts, a laser bonding method may comprise: stacking a plurality of semiconductor chips on a substrate; and providing a laser beam to the plurality of semiconductor chips. The operation of providing the laser beam to the plurality of semiconductor chips may include irradiating the laser beam onto sidewalls of the plurality of semiconductor chips.

DETAILED DESCRIPTION OF EXAMPLE EMBODIMENTS

Figure 1:
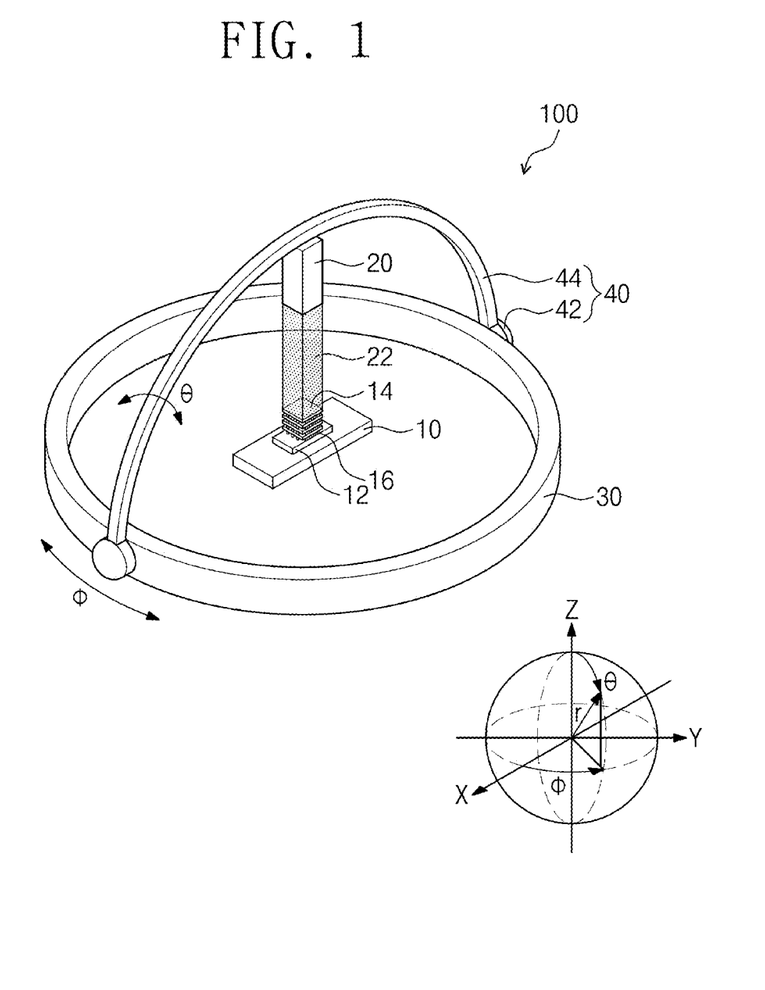
FIG. 1 illustrates a perspective view showing a laser bonding apparatus according to some example embodiments of the present inventive concepts.

FIG. 1 shows an example of a laser bonding apparatus 100 according to the present inventive concepts.

Referring to FIG. 1, the laser bonding apparatus 100 according to the present inventive concepts may include a stage 10, a laser device 20, a first rotation support 30, and/or a second rotation support 40.

The stage 10 may receive a substrate 12. The substrate 12 may include a printed circuit board (PCB). Alternatively, the substrate 12 may include a silicon wafer or a silicon chip, but the present inventive concepts are not limited thereto. A plurality of semiconductor chips 14 may be provided on the substrate 12. The plurality of semiconductor chips 14 may be stacked or mounted in a third direction Z. For example, the plurality of semiconductor chips 14 may include a high bandwidth memory and/or a package-on-package. Each of the plurality of semiconductor chips 14 may have, for example, a plurality of solder bumps 16 at a lower portion thereof. Although not shown, the stage 10 may move along at least one rail therebelow. The rail may extend in a first direction X or a second direction Y. The stage 10 may allow the substrate 12 to move along the rail in the first direction X or the second direction Y.

The stage 10 may be provided thereon with the laser device 20 that is supported by the first rotation support 30 and the second rotation support 40. For example, the laser device 20 may be an infrared laser device. The laser device 20 may output a laser beam 22 whose power ranges from about 1 W to about 4,000 W. The laser beam 22 may have a wavelength of about 600 nm to about 1,700 nm. The laser device 20 may provide the plurality of semiconductor chips 14 with the laser beam 22 whose radiation heat is used to heat up the semiconductor chips 14 and the solder bumps 16. The heated solder bumps 16 may be melted to bond the semiconductor chips 14 to each other and/or to the substrate 12.

The first rotation support 30 and the second rotation support 40 may drive the laser device 20 to slantingly move with respect to the semiconductor chips 14 stacked on the stage 10, and thus the laser device 20 may illuminate the laser beam 22 onto sidewalls or side surfaces of the semiconductor chips 14. For example, the first rotation support 30 may drive the laser device 20 to rotate in an azimuthal angle direction φ, and the second rotation support 40 may drive the laser device 20 to rotate in a polar angle direction θ. The laser beam 22 may uniformly heat the solder bumps 16 between the plurality of semiconductor chips 14, and may prevent or minimize bonding defects of the plurality of semiconductor chips 14.

The first rotation support 30 may be located outside the stage 10. For example, the first rotation support 30 may have a circular ring shape. When the stage 10 is provided on a center of the first rotation support 30, the first rotation support 30 may drive both the second rotation support 40 and the laser device 20 to rotate in the azimuthal angle direction φ. The azimuthal angle direction φ may be defined on a plane formed by the first direction X and the second direction Y. The first rotation support 30 may rotate in the azimuthal angle direction φ on the plane formed by the first direction X and the second direction Y.

The second rotation support 40 may support the laser device 20 onto the first rotation support 30. The second rotation support 40 may be associated with opposite outer sidewalls of the first rotation support 30. The second rotation support 40 may include, for example, a plurality of axle parts 42 and an arc part 44. The axle parts 42 may be associated with the opposite outer sidewalls of the first rotation support 30. The axle parts 42 may be provided at opposite ends of the second rotation support 40, and may be rotationally coupled to the opposite outer sidewalls of the first rotation support 30. For example, each of the axle parts 42 may include a shaft. The arc part 44 may be connected between the axle parts 42. The arc part 44 may rotate in the polar angle direction θ about a central axis that passes through the axle parts 42. The arc part 44 may support the laser device 20. The laser device 20 may be located on a center of a bottom surface of the arc part 44.

Figure 2:
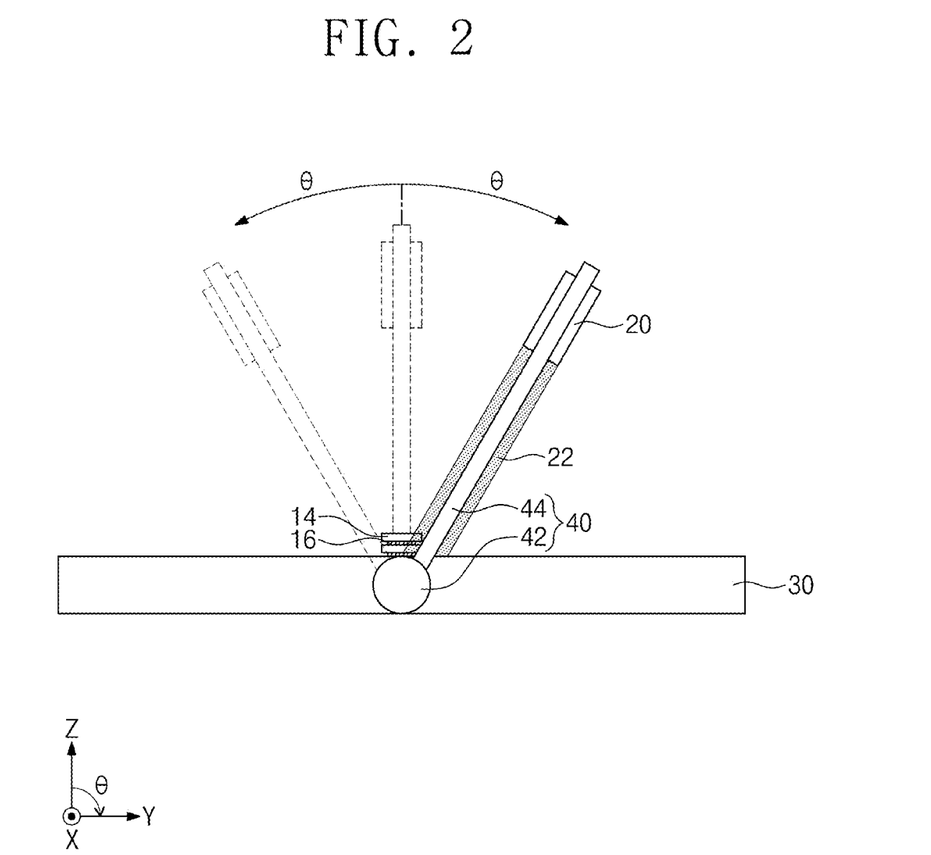
FIG. 2 illustrates a side view showing an example of a second rotation support depicted in FIG. 1.

FIG. 2 shows an example of the second rotation support 40 depicted in FIG. 1.

Referring to FIG. 2, the arc part 44 of the second rotation support 40 may drive the laser device 20 to rotate in the polar angle direction θ relative to the third direction Z. The polar angle direction θ may indicate an inclined direction of the arc part 44 and the laser device 20 relative to the third direction Z. For example, the arc part 44 of the second rotation support 40 may rotate about 0° to about 90° in the polar angle direction θ relative to the third direction Z perpendicular to the first rotation support 30. When the arc part 44 causes the laser device 20 to tilt in the polar angle direction θ, the laser beam 22 may be provided onto the sidewalls of the semiconductor chips 14.

Referring back to FIG. 1, a diameter direction r may indicate a direction that defines a distance between the laser device 20 and the semiconductor chips 14. The laser beam 22 may provide the semiconductor chips 14 with radiation heat without loss regardless of the distance between the laser device 20 and the semiconductor chips 14. This may be due to the fact that the laser beam 22 has directionality without radial radiation and propagates distantly regardless of the distance defined by the diameter direction r.

Figure 3:
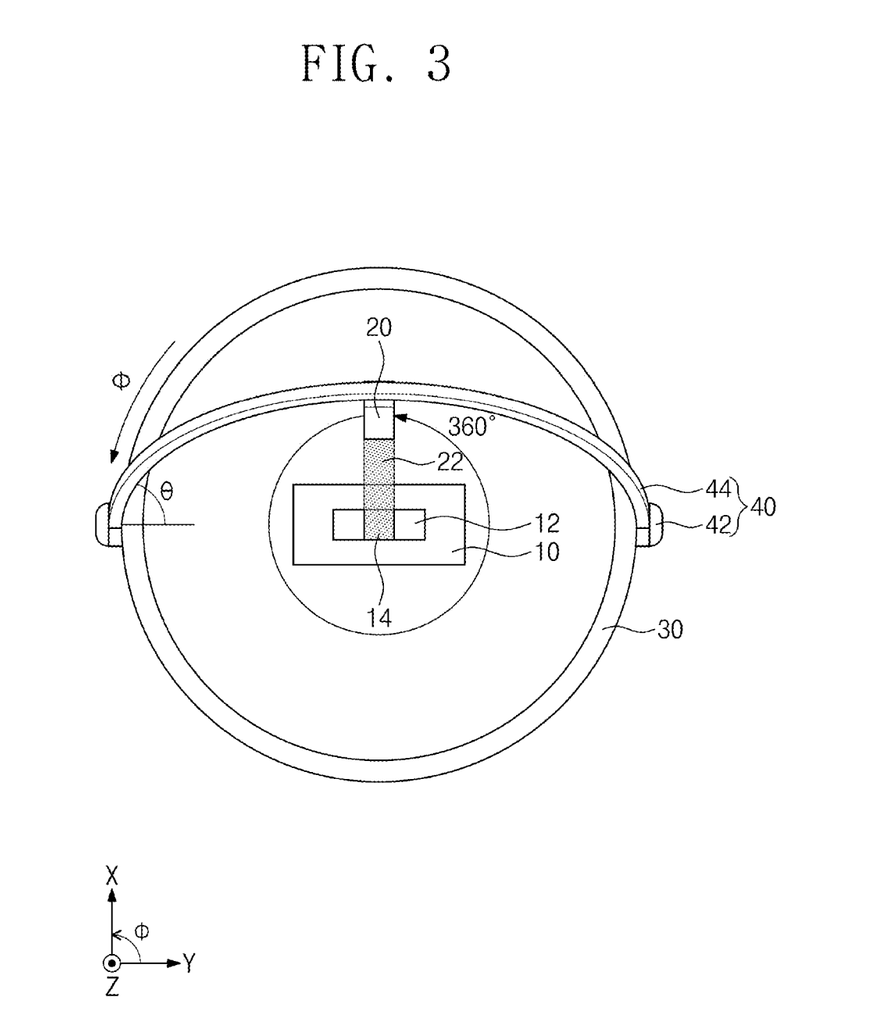
FIG. 3 illustrates a plan view showing an example of a laser device that rotates in an azimuthal angle direction along a first rotation support depicted in FIG. 1.

FIG. 3 shows an example of the laser device 20 that rotates in the azimuthal angle direction φ along the first rotation support 30 depicted in FIG. 1.

Referring to FIG. 3, when the arc part 44 of the second rotation support 40 tilts in the polar angle direction θ, and when the first rotation support 30 rotates in the azimuthal angle direction φ, the laser device 20 may irradiate the laser beam 22 onto entire, or almost entire, sidewalls of the semiconductor chips 14. The laser device 20 may rotate about 360° in the azimuthal angle direction φ along the sidewalls of the semiconductor chips 14. The laser beam 22 may uniformly heat the semiconductor chips 14 and the solder bumps 16, thereby preventing or minimizing bonding defects.

Figure 4:
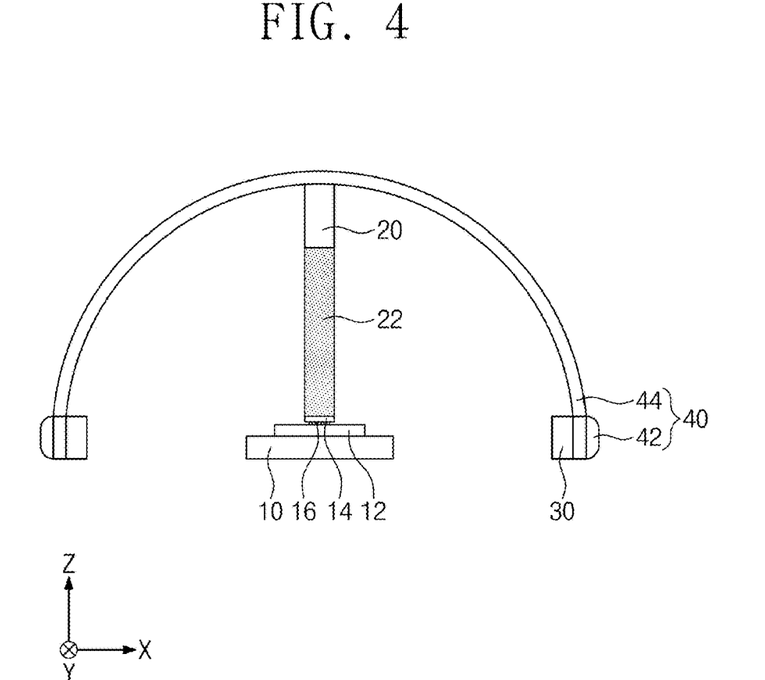
FIG. 4 illustrates a side view showing an example of a laser device fixed to a center of an arc part of a second rotation support depicted in FIG. 1.

FIG. 4 shows an example of the laser device 20 fixed to a center of the arc part 44 of the second rotation support 40 depicted in FIG. 1.

Referring to FIG. 4, the laser device 20 may be fixed to the center of the bottom surface of the arc part 44. For example, the laser device 20 may provide one semiconductor chip 14 with the laser beam 22 in a direction opposite to the third direction Z. When the plurality of semiconductor chips 14 are provided with the laser beam 22 in a direction opposite to the third direction Z, the plurality of semiconductor chips 14 and the solder bumps 16 may be irregularly heated to produce bonding defects. An uppermost one of the plurality of semiconductor chips 14 may be more highly heated than its underlying semiconductor chips, and thus the solder bumps 16 may be irregularly melted in a direction opposite to the third direction Z, which may result in the presence of bonding defects between the substrate 12 and the semiconductor chips 14.

Figure 5:
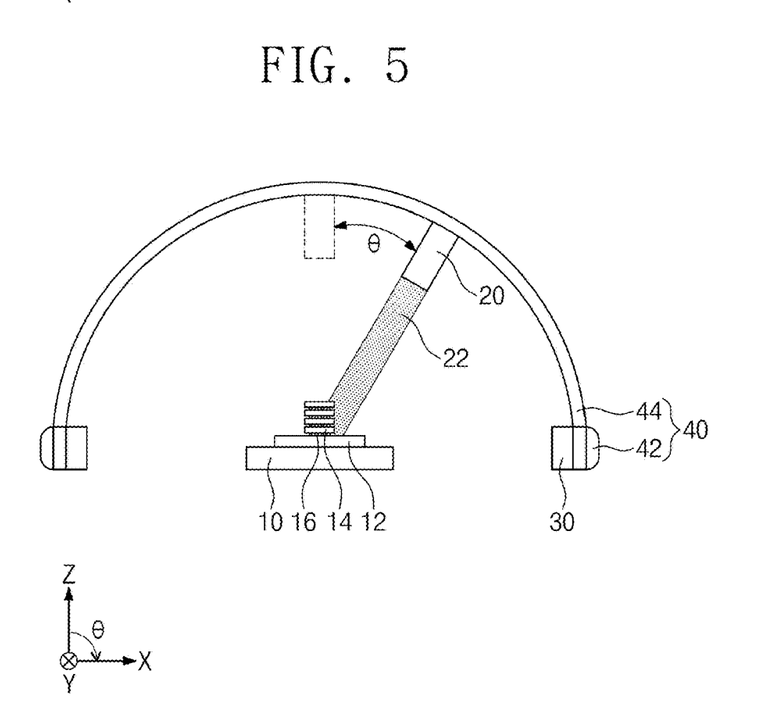
FIG. 5 illustrates a side view showing an example of a laser device that moves along an arc part of a second rotation support depicted in FIG. 1.

FIG. 5 shows an example of the laser device 20 that moves along the arc part 44 of the second rotation support 40 depicted in FIG. 1.

Referring to FIG. 5, the laser device 20 may move along the bottom surface or an inner sidewall of the arc part 44 of the second rotation support 40 to provide the laser beam 22 to the sidewalls of the plurality of semiconductor chips 14. The laser device 20 may move in the polar angle direction θ relative to the third direction Z. Although not shown, the arc part 44 may have a moving driver therein. The moving driver may drive the laser device 20 to move along the bottom surface or the inner sidewall of the arc part 44.

Figure 6:
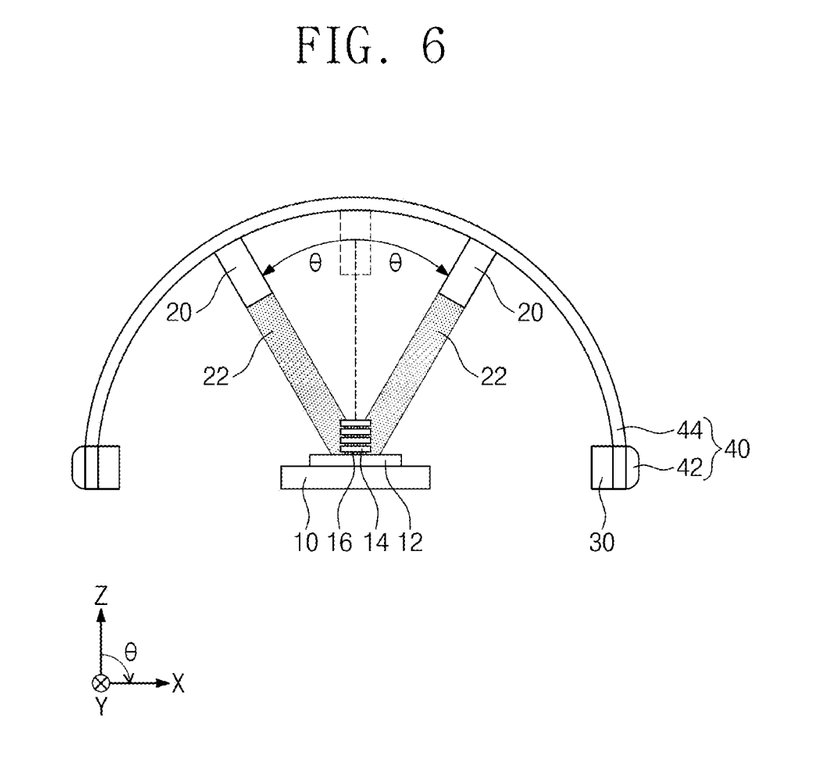
FIG. 6 illustrates a side view showing an example of a plurality of laser devices that move along a second rotation support depicted in FIG. 1.

FIG. 6 shows an example of a plurality of laser devices 20 that move along the second rotation support 40 depicted in FIG. 1.

Referring to FIG. 6, the plurality of laser devices 20 may move toward opposite sides of the arc part 44 of the second rotation support 40 to provide the laser beams 22 to opposite sidewalls of the plurality of semiconductor chips 14. The laser beams 22 may uniformly heat the solder bumps 16 to bond the semiconductor chips 14 and the substrate 12 to each other without defects. Although not shown, the arc part 44 may have therein moving drivers that drive the plurality of laser devices 20 to move along the bottom surface or the inner sidewall of the arc part 44.

Figure 7:
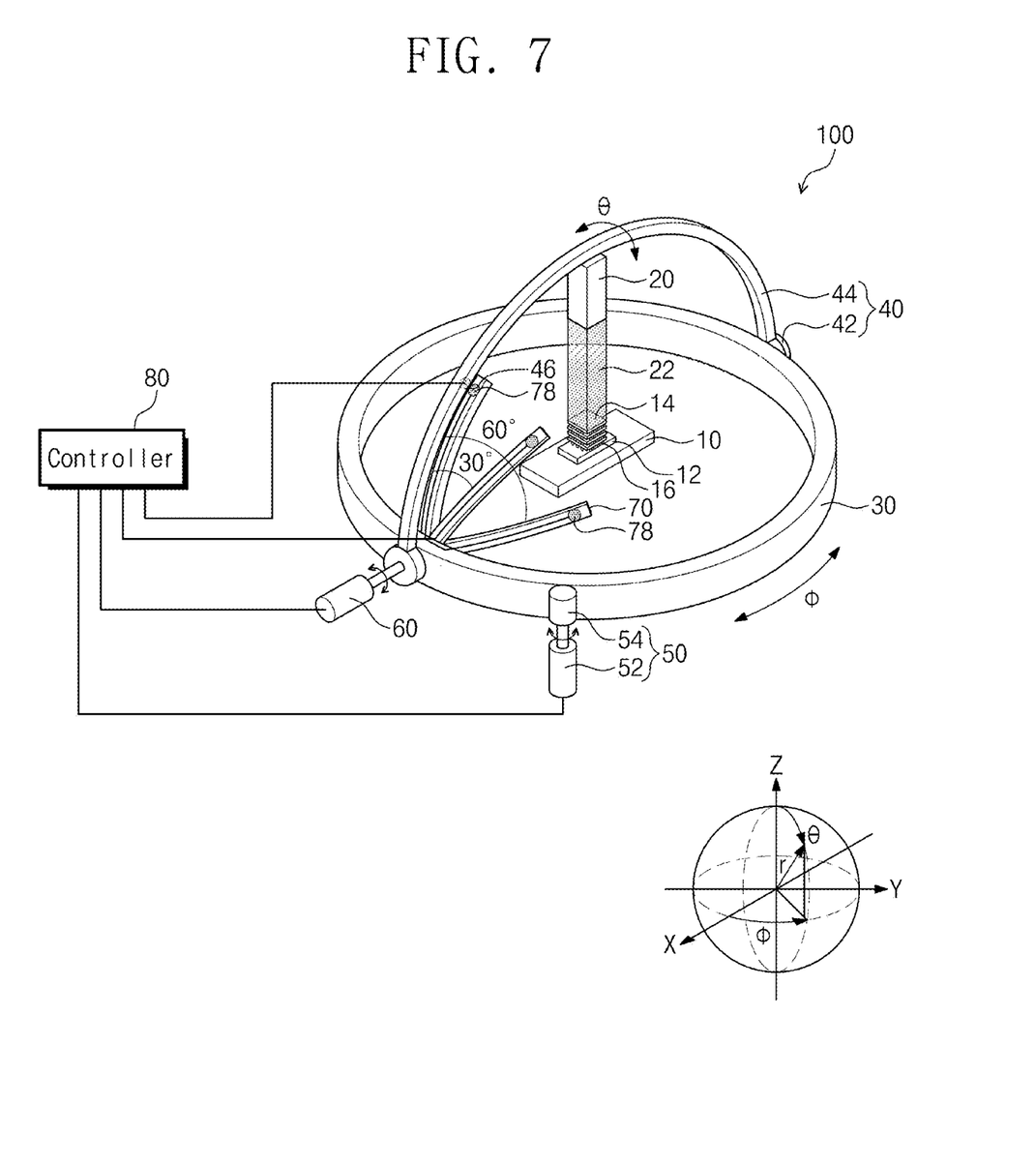
FIG. 7 illustrates a perspective view showing a laser bonding apparatus according to some example embodiments of the present inventive concepts.

FIG. 7 shows an example of the laser bonding apparatus 100 according to the present inventive concepts.

Referring to FIG. 7, the laser bonding apparatus 100 according to the present inventive concepts may further include a first rotation driver 50, a second rotation driver 60, a plurality of guides 70, and/or a controller 80. The stage 10 and the laser device 20 may be configured identically to those of FIG. 1.

The first rotation driver 50 may be located adjacent to the first rotation support 30. The first rotation driver 50 may drive the first rotation support 30 to rotate in the azimuthal angle direction φ. The first rotation driver 50 may include a first motor 52 and a pulley 54. The first motor 52 may be connected to the controller 80. The first motor 52 may generate a rotation power in response to a control signal from the controller 80. The pulley 54 may be connected to a central shaft of the first motor 52. The pulley 54 may be in contact with an outer sidewall of the first rotation support 30. When the first motor 52 generates the rotation power, the pulley 54 may produce friction with the first rotation support 30 and may force the first rotation support 30 to rotate in the azimuthal angle direction φ.

The second rotation driver 60 may be associated with one side of the second rotation support 40. For example, the second rotation driver 60 may be associated with one of the axle parts 42 of the second rotation support 40. The second rotation driver 60 may include a second motor. The second rotation driver 60 may be connected to the controller 80. In response to a control signal from the controller 80, the second rotation driver 60 may drive the second rotation support 40 to cause its axle parts 42 and the arc part 44 to rotate in the polar angle direction θ.

A first contact point 46 may be provided on the bottom surface or the inner sidewall of the arc part 44 of the second rotation support 40. The first contact point 46 may be disposed between the laser device 20 and one of the axle parts 42. The first contact point 46 may be connected to the controller 80.

The guides 70 may be placed under the arc part 44. The first rotation support 30 may be provided with the guides 70 coupled to its inner sidewall adjacent to one of the axle parts 42 of the second rotation support 40. Alternatively, the guides 70 may be installed on the first rotation support 30 under the arc part 44. The guides 70 may each have a finger shape or a quarter-sphere shape. The guides 70 may have their second contact points 78. The second contact points 78 may be arranged in the polar angle direction θ at a regular angle and/or interval. The second contact points 78 may be connected to the controller 80. Whenever the arc part 44 rotates in the polar angle direction θ, one of the second contact points 78 may be electrically connected to the first contact point 46. The controller 80 may be configured such that an electrical connection signal between the first contact point 46 and one of the second contact points 78 is detected to distinguish a rotation angle in the polar angle direction θ of the arc part 44. For example, the controller 80 may distinguish an inclined angle in the polar angle direction θ of the laser device 20 with respect to the semiconductor chips 14.

Figure 8:
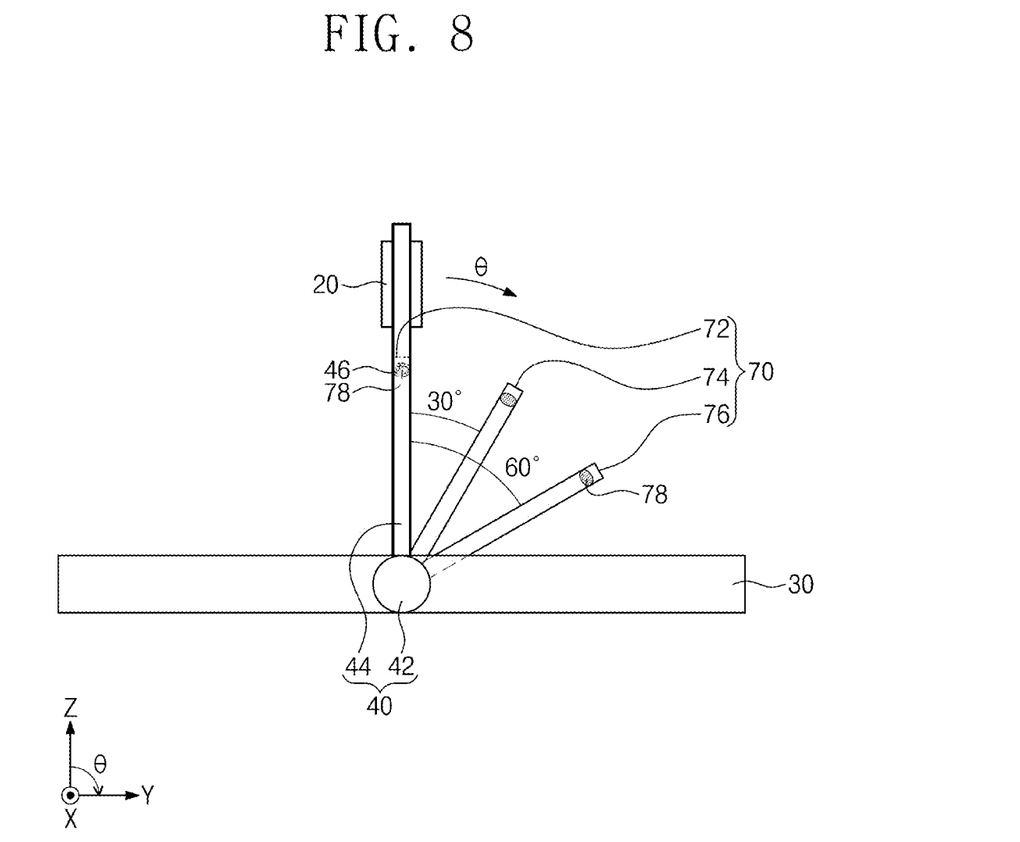
FIG. 8 illustrates a side view showing an example of guides depicted in FIG. 7.

FIG. 8 shows an example of the guides 70 depicted in FIG. 7.

Referring to FIG. 8, the guides 70 may include a first guide 72, a second guide 74, and/or a third guide 76. The first guide 72 may be arranged in the third direction Z. The second guide 74 may be arranged inclined at about 30° in the polar angle direction θ relative to the third direction Z. The third guide 76 may be arranged inclined at about 60° in the polar angle direction θ relative to the third direction Z. The first, second, and third guides 72, 74, and 76 may each have the second contact point 78. When the arc part 44 overlaps one of the first, second, and third guides 72, 74, and 76, the first contact point 46 may be electrically connected to the second contact point 78.

The controller 80 may control such that the first and second rotation drivers 50 and 60 drive the laser device 20 to rotate in the azimuthal angle direction φ and the polar angle direction θ with respect to the substrate 12. For example, the controller 80 may operate to provide the semiconductor chips 14 with the laser beam 22 irradiated vertically or slantingly based on the number or height of the semiconductor chips 14 on the substrate 12. In addition, the controller 80 may use an electrical connection signal between the first and second contact points 46 and 78 to distinguish an inclined angle in the polar angle direction θ of the laser device 20 with respect to the semiconductor chips 14.

The controller 80 may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

When an electrical connection is made between the second contact point 78 of the first guide 72 and the first contact point 46 of the arc part 44, the controller 80 may distinguish that the semiconductor chips 14 are provided with the laser beam 22 irradiated in the third direction Z. When the first contact point 46 is connected to the second contact point 78 of the second guide 74, the controller 80 may distinguish that the semiconductor chips 14 are provided with the laser beam 22 irradiated at an inclined angle of about 30° in the polar angle direction θ. When the first contact point 46 is connected to the second contact point 78 of the third guide 76, the controller 80 may distinguish that the semiconductor chips 14 are provided with the laser beam 22 irradiated at an inclined angle of about 60° in the polar angle direction θ.

The following will discuss a laser bonding method using the laser bonding apparatus 100 configured as described above.

Figure 9:
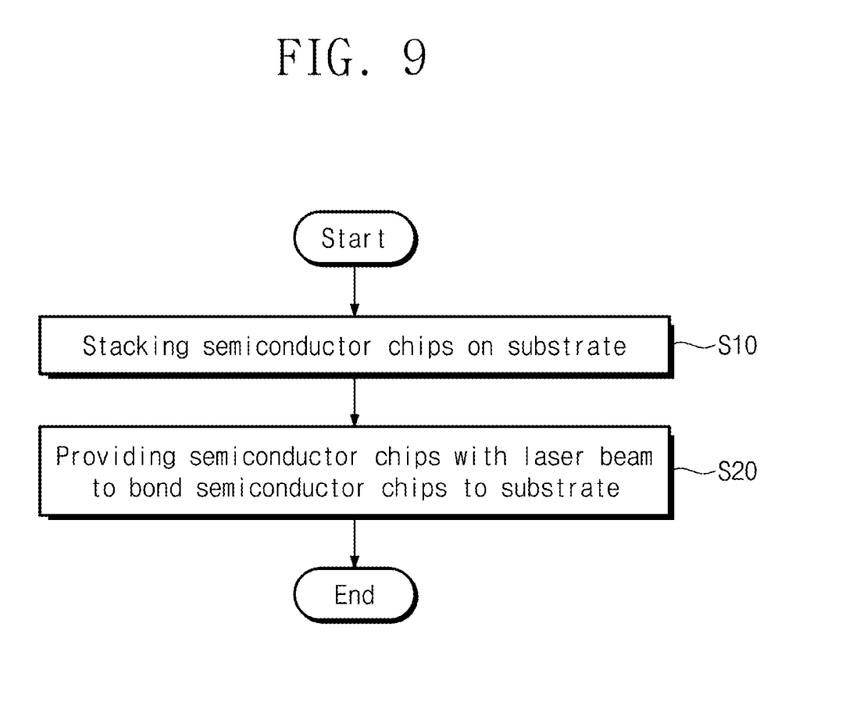
FIG. 9 illustrates a flow chart showing a laser bonding method according to some example embodiments of the present inventive concepts.
Figure 10:
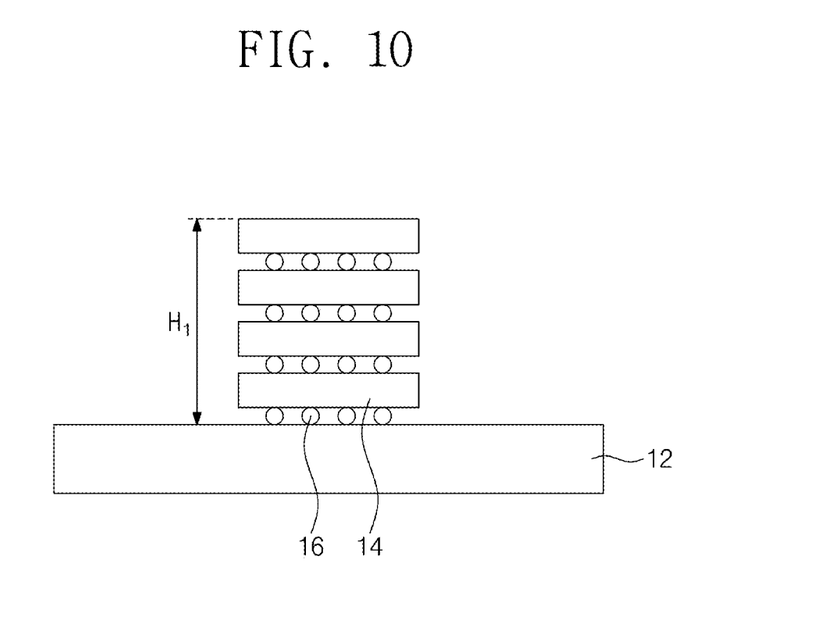
FIGS. 10 and 11 illustrate cross-sectional views showing a laser bonding method performed on semiconductor chips depicted in FIG. 1.
Figure 11:
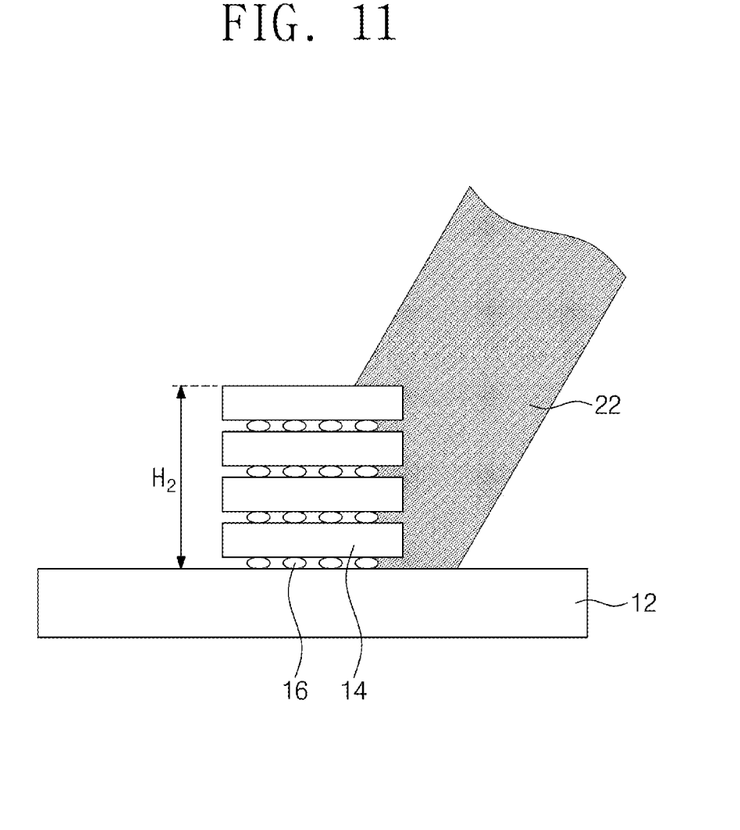

FIG. 9 shows a laser bonding method according to some example embodiments the present inventive concepts. FIGS. 10 and 11 show cross-sectional views of a laser bonding method performed on the semiconductor chips 14 depicted in FIG. 1.

Referring to FIGS. 9 and 10, a picker (not shown) may stack or mount a plurality of semiconductor chips 14 on the substrate 12 (S10). For example, the plurality of semiconductor chips 14 may include a high bandwidth memory and/or a package-on-package. For example, each of the plurality of semiconductor chips 14 may have a plurality of solder bumps 16. The plurality of solder bumps 16 may be provided between the substrate 12 and the semiconductor chips 14. In addition, the plurality of solder bumps 16 may be provided between the plurality of semiconductor chips 14. For example, the semiconductor chips 14 and the solder bumps 16 may define a first height H1 from the substrate 12.

Referring to FIGS. 9 and 11, the laser bonding apparatus 100 may provide the plurality of semiconductor chips 14 with the laser beam 22 to bond the semiconductor chips 14 to the substrate 12 (S20). The laser beam 22 may heat the plurality of semiconductor chips 14 and the solder bumps 16. The solder bumps 16 may be melted with radiation heat from the laser beam 22 to bond the semiconductor chips 14 to the substrate 12. The bonded semiconductor chips 14 and the solder bumps 16 may define a second height H2 less than the first height H1.

Figure 12:
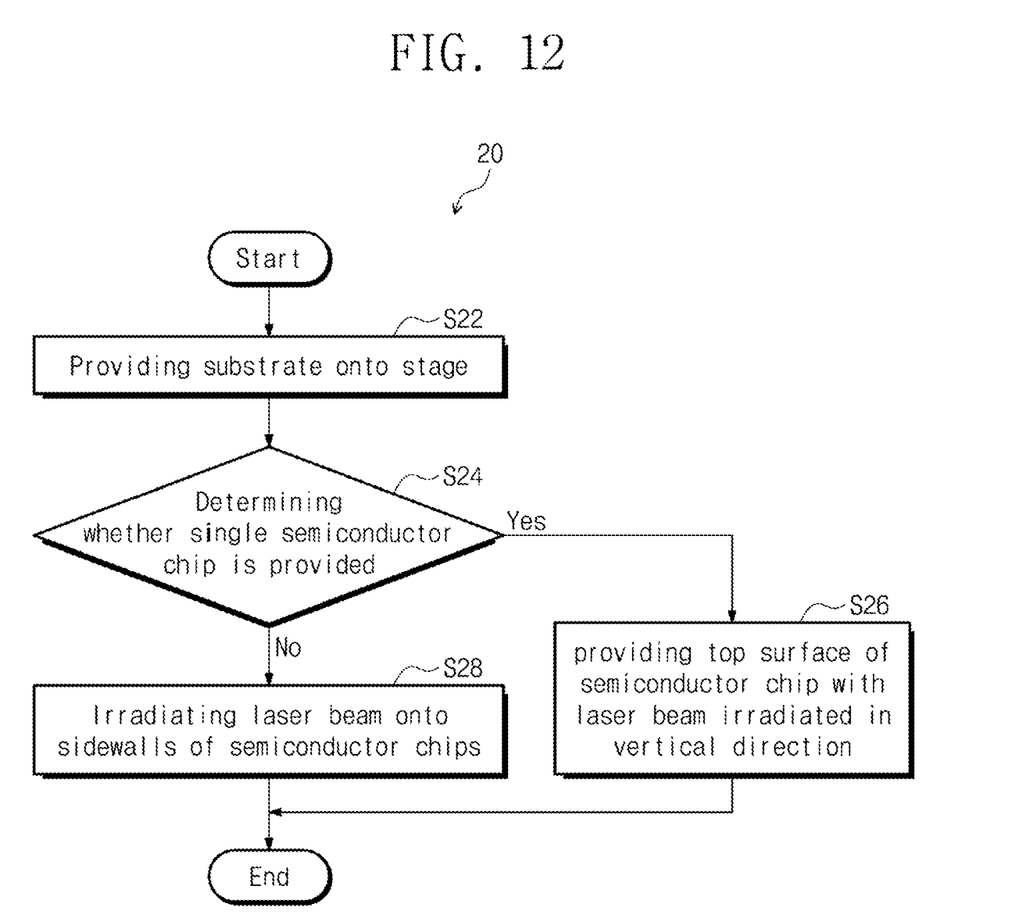
FIG. 12 illustrates a flow chart showing an example of an operation of providing a laser beam to bond semiconductor chips of FIG. 11 to a substrate.

FIG. 12 shows an example of the operation S20 of providing the semiconductor chips 14 depicted in FIG. 11 with the laser beam 22 to bond the semiconductor chips 14 to the substrate 12.

Referring to FIG. 12, a picker (not shown) may provide the substrate 12 onto the stage 10 (S22). The stage 10 may drive the substrate 12 to move into the first rotation support 30.

Afterwards, the controller 80 may determine how many semiconductor chips 14 are provided by using information about the number and/or height of the semiconductor chips 14 on the substrate 12 (S24).

Referring to FIGS. 4 and 12, when one semiconductor chip 14 is provided on the substrate 12, the laser bonding apparatus 100 may provide the semiconductor chip 14 on its top surface with the laser beam 22 irradiated in the third direction Z (S26). The laser beam 22 may heat the semiconductor chip 14 and the solder bumps 16 to bond the semiconductor chip 14 to the substrate 12. The laser beam 22 may be irradiated in a direction opposite to the third direction Z, but the present inventive concepts are not limited thereto.

Referring to FIGS. 1, 7, and 12, when the semiconductor chip 14 is provided in plural, the laser bonding apparatus 100 may irradiate the laser beam 22 onto sidewalls of the plurality of semiconductor chips 14 (S28).

Figure 13:
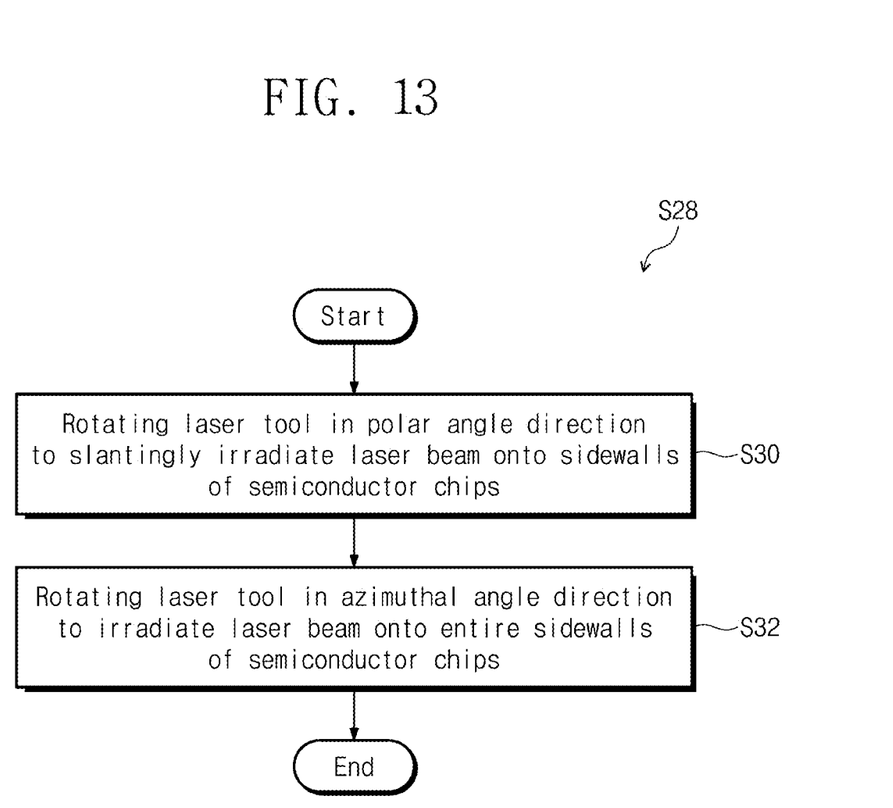
FIG. 13 illustrates a flow chart showing an example of an operation of irradiating a laser beam onto sidewalls of semiconductor chips depicted in FIG. 11.

FIG. 13 shows an example of operation S28 of irradiating the laser beam 22 onto the sidewalls of the semiconductor chips 14 depicted in FIG. 11.

Referring to FIGS. 2, 7, 8, and 13, the controller 80 and the second rotation driver 60 may drive the laser device 20 to rotate in the polar angle direction θ to slantingly (>0° to ≤90°) irradiate the laser beam 22 onto the sidewall of the semiconductor chips 14 (S30). For example, the laser beam 22 may be slantingly irradiated in the polar angle direction θ in proportion to the number and/or height of the semiconductor chips 14. When about four semiconductor chips 14 are stacked on the substrate 12, the semiconductor chips 14 may be provided on their sidewalls with the laser beam 22 irradiated at an inclined angle of about 30° in the polar angle direction θ. When about five semiconductor chips 14 are stacked on the substrate 12, the semiconductor chips 14 may be provided on their sidewalls with the laser beam 22 irradiated at an inclined angle of about 60° in the polar angle direction θ.

Referring to FIGS. 3, 7, and 13, the controller 80 and the first rotation driver 50 may drive the laser device 20 to rotate in the polar angle direction θ to irradiate the laser beam 22 onto the entire sidewalls of the semiconductor chips 14 (S32). The laser device 20 may rotate in the azimuthal angle direction φ at about 360° to irradiate the laser beam 22 onto the entire sidewalls of the semiconductor chips 14. The solder bumps 16 may be uniformly melted to bond the semiconductor chips 14 to the substrate 12.

As discussed above, a laser bonding apparatus according to some example embodiments of the present inventive concepts may be configured such that a plurality of semiconductor chips are provided on their sidewalls with a laser beam that is slantingly irradiated to remove and minimize bonding defects of the plurality of semiconductor chips.

Although the present inventive concepts have been described in connection with the embodiments of the present inventive concepts illustrated in the accompanying drawings, it will be understood to those skilled in the art that various changes and modifications may be made without departing from the technical spirit and essential feature of the present inventive concepts. It therefore will be understood that the embodiments described above are just illustrative but not limitative in all aspects.

What is claimed is:

1. A laser bonding apparatus, comprising:
    a stage configured to receive a substrate;
    a laser device over the stage, the laser device configured to irradiate a laser beam onto the substrate;
    a first rotation support outside of the stage, the first rotation support configured to drive the laser device to rotate in an azimuthal angle direction; and
    a second rotation support configured to support the laser device and configured to drive the laser device to rotate in a polar angle direction intersecting the azimuthal angle direction.

2. The laser bonding apparatus of claim 1, wherein the first rotation support has a circular ring shape.

3. The laser bonding apparatus of claim 1, wherein the second rotation support includes:
    a plurality of axle parts associated with opposite outer sidewalls of the first rotation support; and
    an arc part connected between the axle parts, the arc part supporting the laser device.

4. The laser bonding apparatus of claim 3, wherein the laser device is configured to move along a bottom surface or an inner sidewall of the arc part.

5. The laser bonding apparatus of claim 3, wherein the arc part has a first contact point between the laser device and one of the plurality of axle parts.

6. The laser bonding apparatus of claim 5, further comprising a plurality of guides provided on an inner sidewall of the first rotation support adjacent to one of the plurality of axle parts,
    wherein the plurality of guides have second contact points arranged in the polar angle direction at a regular angle or interval to correspond to the first contact point.

7. The laser bonding apparatus of claim 6, wherein each of the plurality of guides has a finger shape or a quarter-sphere shape.

8. The laser bonding apparatus of claim 6, further comprising:
    a first rotation driver in contact with an outer sidewall of the first rotation support, the first rotation driver configured to drive the first rotation support to rotate in the azimuthal angle direction; and
    a second rotation driver associated with one of the plurality of axle parts of the second rotation support, the second rotation driver configured to drive the arc part to rotate in the polar angle direction.

9. The laser bonding apparatus of claim 8, wherein the first rotation driver includes:
a motor; and
a pulley connected to the motor, the pulley configured to produce friction with a sidewall of the first rotation support and configured to rotate the first rotation support.

10. The laser bonding apparatus of claim 8, further comprising a controller connected to the first and second rotation drivers and the first and second contact points,
wherein, whenever the first contact point is electrically connected to one of the second contact points, the controller is configured to distinguish an inclined angle in the polar angle direction of the laser device with respect to the substrate.

11. A laser bonding apparatus, comprising:
a stage configured to receive a substrate;
a laser device over the stage, the laser device configured to provide the substrate with a laser beam to heat a plurality of semiconductor chips;
a first rotation support that surrounds the stage and supports the laser device, the first rotation support configured to drive the laser device to rotate in an azimuthal angle direction;
a second rotation support that includes a plurality of axle parts associated with opposite outer sidewalls of the first rotation support and an arc part connected between the plurality of axle parts, the arc part having a first contact point between the laser device and one of the plurality of axle parts;
a plurality of guides provided on an inner sidewall of the first rotation support under the second rotation support, the guides having a plurality of second contact points that are arranged in a polar angle direction to correspond to the first contact point; and
a controller connected to the first contact point and the second contact points, the controller configured to distinguish an inclined angle in the polar angle direction of the laser device with respect to the semiconductor chips whenever the first contact point is connected to one of the second contact points.

12. The laser bonding apparatus of claim 11, wherein the plurality of guides include a first guide arranged in a direction perpendicular to the stage.

13. The laser bonding apparatus of claim 12, wherein the plurality of guides further include:
a second guide arranged in a direction inclined at about 30° relative to the direction perpendicular to the stage; and
a third guide arranged in a direction inclined at about 60° relative to the direction perpendicular to the stage.

14. The laser bonding apparatus of claim 11, further comprising:
a first rotation driver in contact with an outer sidewall of the first rotation support, the first rotation driver configured to drive the first rotation support to rotate in the azimuthal angle direction; and
a second rotation driver associated with one of the axle parts of the second rotation support, the second rotation driver configured to drive the arc part to rotate in the polar angle direction.

15. The laser bonding apparatus of claim 14, wherein the first rotation driver includes:
a motor; and
a pulley connected to the motor, the pulley configured to produce friction with a sidewall of the first rotation support and configured to rotate the first rotation support.

16. A laser bonding apparatus, comprising:
a stage configured to receive a substrate;
a laser device over the stage, the laser device configured to irradiate a laser beam onto the substrate;
a first rotation support that surrounds the stage, the first rotation support configured to drive the laser device to rotate in an azimuthal angle direction;
a second rotation support configured to support the laser device and configured to drive the laser device to rotate in a polar angle direction intersecting the azimuthal angle direction; and
a controller configured to determine a number of semiconductor chips stacked on the substrate, and to control rotation of the first and second rotation supports based on the number of semiconductor chips stacked on the substrate.

17. The laser bonding apparatus of claim 16, wherein upon determining that the number of semiconductor chips stacked on the substrate is greater than one including a plurality of semiconductor chips, the controller is configured to control rotation of the first and second rotation supports to irradiate the laser beam on sidewalls of the plurality of semiconductor chips.

18. The laser bonding apparatus of claim 17, wherein upon determining that the number of semiconductor chips stacked on the substrate is greater than one, the controller is configured to
control rotation of the first rotation support in the polar angle direction to slantingly irradiate the laser beam on the sidewalls of the plurality of semiconductor chips, and
control rotation of the second rotation support in the azimuthal angle direction to irradiate the laser beam on an entirety of the sidewalls of the plurality of semiconductor chips.

19. The laser bonding apparatus of claim 16, wherein upon determining that the number of semiconductor chips stacked on the substrate is a single semiconductor chip, the controller is configured to control rotation of the first and second rotation supports to irradiate the laser beam on a top surface of the single semiconductor chip.

20. The laser bonding apparatus of claim 16, wherein the first rotation support has a circular ring shape, and
the second rotation support comprises:
a plurality of axle parts associated with opposite outer sidewalls of the first rotation support; and
an arc part connected between the axle parts, the arc part supporting the laser device.

* * * * *